United States Patent [19]

Andrä et al.

[11] Patent Number: 4,711,206
[45] Date of Patent: Dec. 8, 1987

[54] TWO-CHAMBER ENGINE MOUNT WITH HYDRAULIC DAMPING

[75] Inventors: Rainer Andrä, Limburg; Manfred Hofmann, Hünfelden, both of Fed. Rep. of Germany

[73] Assignee: Metzeler Kautschuk GmbH, Munich, Fed. Rep. of Germany

[21] Appl. No.: 889,478

[22] Filed: Jul. 25, 1986

[30] Foreign Application Priority Data

Jul. 25, 1985 [DE] Fed. Rep. of Germany ....... 3526686

[51] Int. Cl.⁴ .............................................. F02B 75/06
[52] U.S. Cl. ................................ 123/192 R; 248/636; 267/140.1
[58] Field of Search .................. 123/192 R, 195 A; 180/312; 188/378, 298; 248/562, 636; 267/8 R, 140.1

[56] References Cited

U.S. PATENT DOCUMENTS

| | | | |
|---|---|---|---|
| 4,159,091 | 6/1979 | Le Salver et al. | 267/113 |
| 4,611,795 | 9/1986 | Muzechuk | 267/140.1 |
| 4,621,795 | 11/1986 | Eberhard et al. | 267/140.1 |
| 4,630,808 | 12/1986 | Ushijima et al. | 267/140.1 |
| 4,635,910 | 1/1987 | Ozawa et al. | 267/140.1 |

*Primary Examiner*—Craig R. Feinberg
*Assistant Examiner*—David A. Okonsky
*Attorney, Agent, or Firm*—Herbert L. Lerner; Laurence A. Greenberg

[57] ABSTRACT

A two-chamber engine mount with hydraulic damping includes rubber-elastic peripheral walls, a rigid intermediate plate disposed within the peripheral walls defining two chambers along with the peripheral walls being acted upon by vibrations induced in a given direction, hydraulic fluid filling the chambers, the intermediate plate having a channel formed therein interconnecting the chambers, the intermediate plate having another chamber formed therein, and a rubber-elastic membrane disc having two sides and being loosely disposed in the other chamber, both of the sides of the membrane disc being acted upon by the hydraulic fluid moving the membrane disc parallel to the given direction for combined frequency and amplitude decoupling.

7 Claims, 6 Drawing Figures

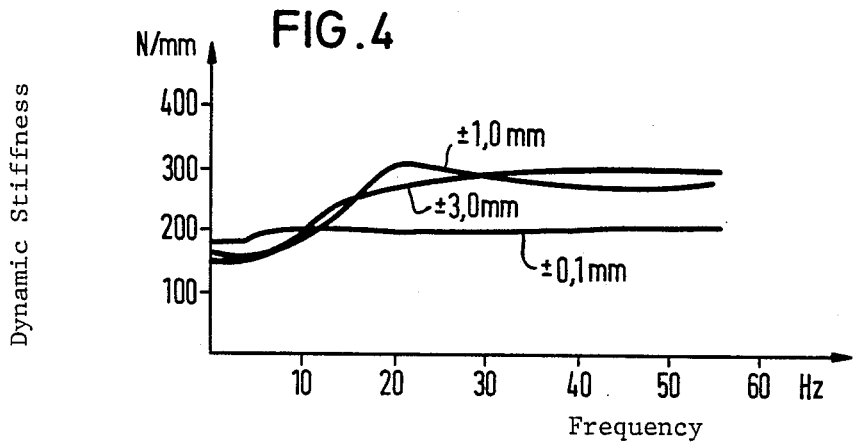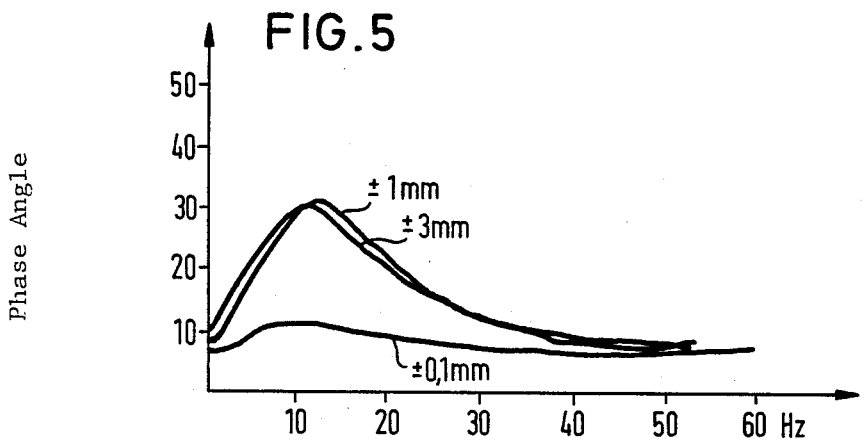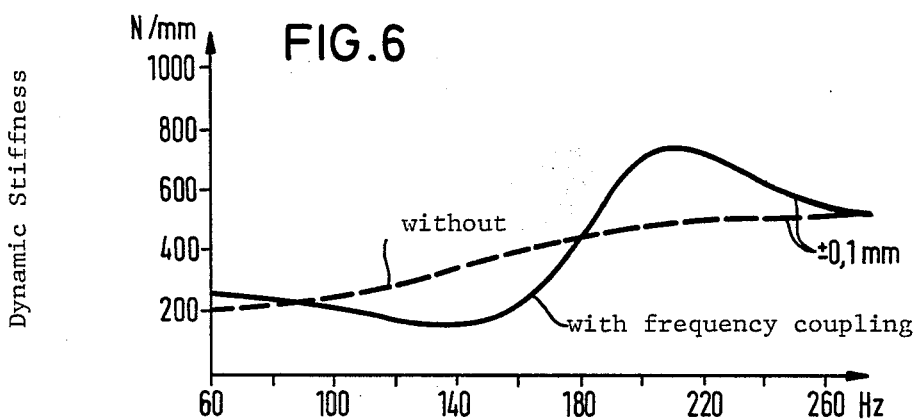

TWO-CHAMBER ENGINE MOUNT WITH HYDRAULIC DAMPING

The invention relates to a two-chamber engine mount or motor support with hydraulic damping, including fluid-filled chambers with rubber-elastic peripheral walls, which are interconnected by a channel in a rigid intermediate plate, the intermediate plate enclosing a membrane disc made of rubber-elastic material which is acted upon on both sides thereof by hydraulic fluid, and which can move parallel to the direction of induced vibrations.

A hydraulically damped engine mount of this type is known from European Patent No. 0 027 751. In that device the rubber-elastic membrane disc is strongly clamped at its peripheral edge in the intermediate plate. Due to its special shape with a thicker, more massive central part and a thinner, more flexible peripheral part, the membrane disc can flex easily, but it offers a significant resistance even to small displacements. The membrane disc therefore influences the dynamic stiffness of the mount considerably, even during vibrations with very small amplitudes.

For certain applications in motor vehicles, it is necessary to provide a dynamic stiffness which is as low as possible in the range where the engine runs at idle speed, but strong damping at greater excited amplitudes and low frequencies.

It is accordingly an object of the invention to provide a two-chamber engine mount with hydraulic damping, which overcomes the hereinafore-mentioned disadvantages of the heretofore-known devices of this general type, wherein the hydraulic function in the low frequency range is practically decoupled i.e. to provide an engine mount which is frequency decoupled as well as amplitude decoupled.

With the foregoing and other objects in view there is provided, in accordance with the invention, a two-chamber engine mount or motor support with hydraulic damping, comprising rubber-elastic peripheral walls, a rigid intermediate plate disposed within the peripheral walls defining two chambers along with the peripheral walls being acted upon by vibrations induced or introduced in a given direction, hydraulic fluid filling the chambers, the intermediate plate having a channel or canal formed therein interconnecting the chambers, the intermediate plate having another chamber formed therein, and a rubber-elastic membrane disc having two sides and being loosely disposed and unrestrained in the other chamber, both of the sides of the membrane disc being acted upon or loaded by the hydraulic fluid moving the membrane disc parallel to the given direction for combined frequency and amplitude decoupling.

In this way, the membrane disc can move freely with the fluid at small amplitudes, without offering any significant resistance to the fluid. The path of maximum resiliency or yielding of the membrane disc within the chamber depends on the respective requirements of each special application.

In accordance with another feature of the invention, the membrane disc in the other chamber moves through a path of maximum resiliency or yielding of between 0.2 and 2 mm in vertical and radial directions.

In order to make it possible to use the system for frequency decoupling in the higher frequency range, it is necessary to adjust the dynamic stiffness of the membrane disc to a suitable value. Therefore, in accordance with an added feature of the invention, the membrane disc is circular and has a center with a reduced thickness.

In accordance with a further feature of the invention there are provided ribs with varying thicknesses extending radially outwardly from the center on at least one of the sides of the membrane disc.

In accordance with a concomitant feature of the invention, there is provided a rigid quenching mass centrally disposed in the membrane disc. This makes it easier to tune or adjust the device for a certain decoupling frequency.

Other features which are considered as characteristic for the invention are set forth in the appended claims.

Although the invention is illustrated and described herein as embodied in a two-chamber engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a graph of the dynamic stiffness of such a mount for the frequency range up to 60 Hz;

FIG. 5 is a graph of a damping curve for the mount at different amplitudes; and

FIG. 6 is a graph of the dynamic stiffness of the mount at frequencies between 60 and 260 Hz.

Figure 1:
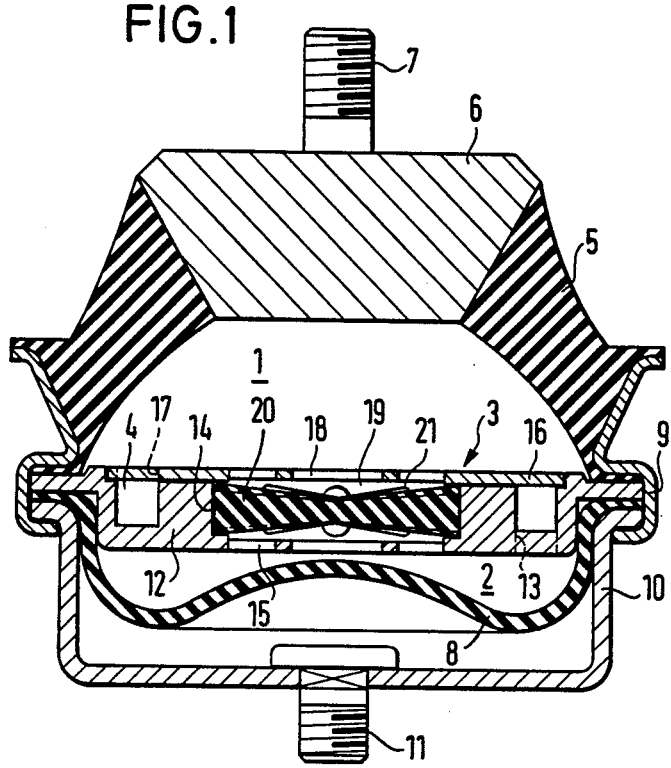
FIG. 1 is a diagrammatic, longitudinal-sectional view of a two-chamber engine mount.
Figure 2:
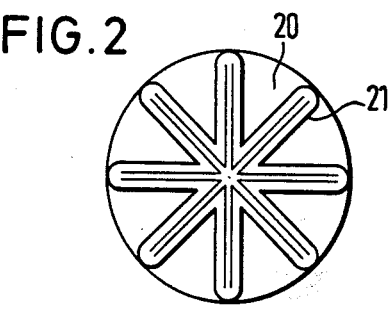
FIG. 2 is a top-plan view of a membrane disc.

Referring now to the figures of the drawings in detail and first, particularly, to FIG. 1 thereof, there is seen a two-chamber engine mount or motor support conventionally provided with an upper engine or motor-side chamber 1 and a lower chamber 2, which are in connection with each other through a channel or canal 4 disposed in an intermediate plate 3. The upper chamber 1 is surrounded by a thick-walled, hollow, conical chamber wall 5, which is a so-called support spring and is provided at its upper end or surface with a support plate 6, which carries a bolt or stud 7 for securing the device to a non-illustrated engine or motor. The lower chamber 2 is formed by a chamber wall 8, which is also made of rubber-elastic material, but is softer than the material of the chamber wall 5, because the chamber 2 actually only functions as an equalization chamber. All of the parts of the mount are fluid-tightly sealed and clamped by a peripheral ring flange 9, since the ring flange 9 at the same time retains a lower housing cover 10, which also has a bolt or stud 11 for holding the mount to the chassis of a motor vehicle.

According to the illustrated embodiment, the intermediate plate is formed of a base plate 12 into which the annular channel 4 is machined, leaving a perforation or passageway 13 which opens toward the bottom. Furthermore, the base plate 12 has a central cylindrical recess 14, which also has perforations or passageways 15 at the bottom thereof. The recesses 4 and 14 in the base plate can be closed by a centrally disposed cover plate 16. The cover plate 16 has an opening 17 formed therein which serves as a connection from the ring channel 4 to the upper chamber 1, as well as perforations or passageways 18 above the recess 14.

A circular membrane disc or membrane 20 of rubber-elastic material is inserted in a chamber 19, which is formed by the recess 14. Therefore, the width and height of the membrane disc are not larger than the recess 14, so that the path of maximum resiliency or yielding in the vertical and radial direction lies in the range of 0.2-2 mm, dependent on the application.

During vibrations with a small excited amplitude in the order of 0.1 mm, the membrane 20 can freely follow the motions of the fluid, without offering any resistance. The mount is therefore coupled with regard to its hydraulic function up to certain amplitudes. As shown in FIG. 4, wherein the dynamic stiffness is plotted against a frequency range of up to 60 Hz, the dynamic stiffness can be kept very low at small amplitudes due to this decoupling. This is very useful at the normal idle speed of the engine or motor, advantageously between 20 and 30 Hz. in order to suppress the noise between the engine or motor and the chassis.

Furthermore, as shown in the diagram according to FIG. 5, in which the phase angle between the excited and the transmitted force is plotted against the frequency, at a low amplitude of about 0.1 mm, a small phase angle can be observed in the relevant frequency range, in comparison to the phase angle at greater amplitudes.

The decisive parameters for frequency and amplitude decoupling are the path of greatest resiliency or yielding and the effective area of the membrane, which can be adjusted in order to achieve the desired effect.

In order to achieve frequency decoupling in a higher frequency range, it is advantageous to shape the membrane disc 20 in such a way that the thickness decreases toward the center, as shown in FIG. 1. Due to this configuration, the thicker peripheral edge of the membrane disc 20 lies against the outer periphery, while the thinner middle part of the membrane disc 20 can vibrate freely, which therefore influences the dynamic stiffness in the higher frequency range.

In FIG. 6, the dynamic stiffness is plotted for the frequency range between 60 and 260 Hz. The graph shows that with a suitable placement and configuration of the membrane 20, the frequency decoupling considerably reduces the dynamic stiffness in the frequency range for a given application, as compared to that which would be the case if no frequency decoupling was provided. Furthermore, in order to additionally increase the capability of adjusting the stiffness of the membrane disc, it is practical to provide the membrane disc 20 with ribs 21 which emanate from the center, extend radially outward, and can have different thicknesses. It thus becomes possible to limit the bending and the vibrating of the middle part of the membrane disc.

Figure 3:
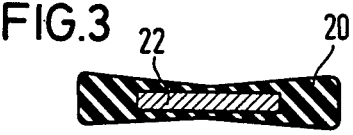
FIG. 3 is a cross-sectional view of a membrane disc with an inserted quenching mass.

In order to provide additional adjustment or tuning compatibility, according to FIG. 3, the membrane disc is provided with a central rigid quenching mass 22 in the form of a metal disc, which influences the mass and the stiffness of the membrane disc.

In general, a suitable choice and adjustment of the parameters such as stiffness, mass-loading and geometry of the membrane disc, permits the decoupling frequency to be adjusted in the range between 60 and 300 Hz.

The foregoing is a description corresponding in substance to German Application P P No. 35 26 686.4, dated July 25, 1985, the International priority of which is being claimed for the instant application, and which is hereby made part of this application. Any material discrepancies between the foregoing specification and the aforementioned corresponding German application are to be resolved in favor of the latter.

We claim:

1. Two-chamber engine mount with hydraulic damping, comprising rubber-elastic peripheral walls, a rigid intermediate plate disposed within said peripheral walls defining two chambers along with said peripheral walls being acted upon by vibrations induced in a given direction, hydraulic fluid filling said chambers, said intermediate plate having substantially planar upper and lower surfaces, said intermediate plate having a channel formed therein interconnecting said chambers, said intermediate plate having another chamber formed therein, said upper and lower surfaces of said intermediate plate having perforations formed therein above and below said other chamber defining a liquid-permeable cage, and a circular rubber-elastic membrane disc having two sides and a center with a reduced thickness, said membrane disc being loosely disposed in said other chamber, both of said sides of said membrane disc being acted upon by said hydraulic fluid moving said membrane disc parallel to said given direction for combined frequency and amplitude decoupling.

2. Two-chamber engine mount according to claim 1, wherein said membrane disc in said other chamber moves through a path of maximum resiliency of between 0.2 and 2 mm in vertical and radial directions.

3. Two-chamber engine mount according to claim 1, including ribs with varying thicknesses extending radially outwardly from said center on at least one of said sides of said membrane disc.

4. Two-chamber engine mount according to claim 1, including a rigid quenching mass centrally disposed in said membrane disc.

5. Two-chamber engine mount according to claim 2, including a rigid quenching mass centrally disposed in said membrane disc.

6. Two-chamber engine mount according to claim 1, including a rigid quenching mass centrally disposed in said membrane disc.

7. Two-chamber engine mount according to claim 3, including a rigid quenching mass centrally disposed in said membrane disc.

* * * * *